S. OROSZ.
HORSESHOE.
APPLICATION FILED JAN. 17, 1910.
957,707.
Patented May 10, 1910.
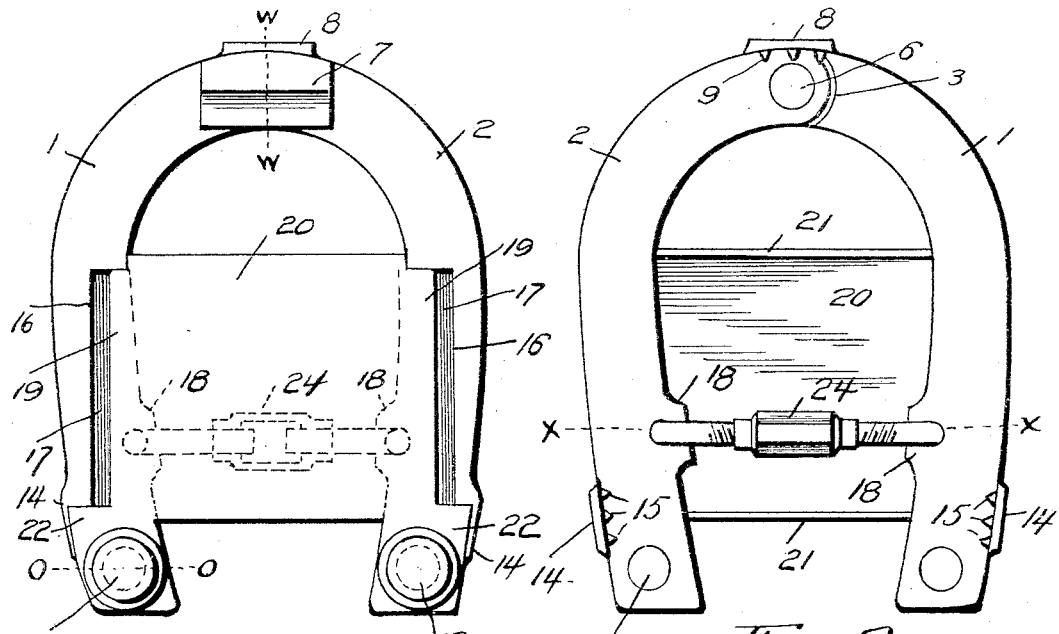
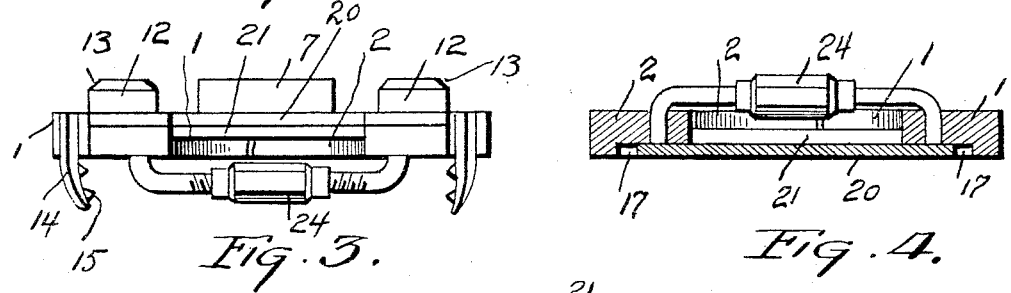
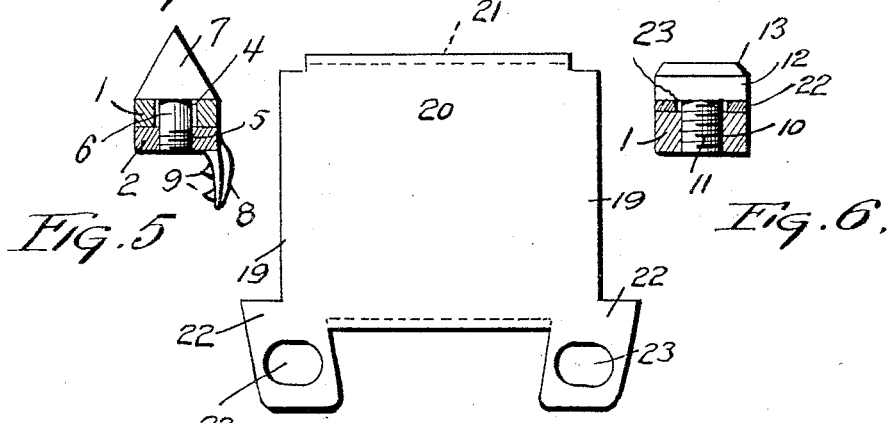
WITNESSES
A. H. Rabsag,
K. K. Butler
INVENTOR
S. Orosz
By N. C. Everts & Co.
Attorneys

UNITED STATES PATENT OFFICE.

STEPHEN OROSZ, OF MONTANA MINES, WEST VIRGINIA.

HORSESHOE.

957,707.

Specification of Letters Patent. Patented May 10, 1910.

Application filed January 17, 1910. Serial No. 538,440.

*To all whom it may concern:*

Be it known that I, STEPHEN OROSZ, a subject of the King of Hungary, residing at Montana Mines, in the county of Marion and State of West Virginia, have invented certain new and useful Improvements in Horseshoes, of which the following is a specification, reference being had therein to the accompanying drawing.

This invention relates to horseshoes, and the objects of my invention are to provide a horseshoe that can be easily fitted to various sizes and shapes of hoofs, and to furnish a shoe with means as will be hereinafter set forth for protecting and shielding the device employed for clamping and retaining the shoe upon a hoof.

Other objects of the invention are to provide a horseshoe with detachable toe and heel calks that can be removed and sharpened when dull or injured, and to obviate the necessity of using nails to secure a shoe to a hoof.

Further objects of the invention are to provide a horseshoe that can be easily and quickly placed in position and removed when desired, and to accomplish the above objects by a shoe that is simple in construction, durable, and highly efficient for the purposes for which it is intended.

With these and such other objects in view as may hereinafter appear, the invention consists of the novel construction, combination and arrangement of parts to be hereinafter specifically described and then claimed.

Reference will now be had to the drawing forming a part of this specification, wherein:—

Figure 1 is a bottom plan of a horseshoe constructed in accordance with my invention, Fig. 2 is a top plan of the same, Fig. 3 is a view of one end of the shoe, Fig. 4 is a cross sectional view of the shoe taken on the line x—x of Fig. 2, Fig. 5 is a cross sectional view taken on the line w—w of Fig. 1, Fig. 6 is a similar view taken on the line o—o of Fig. 1, and Fig. 7 is a plan of a detached protecting and shielding plate adapted to form part of the shoe.

A horseshoe constructed in accordance with this invention comprises two sections 1 and 2, each section representing approximately one-half of an ordinary shoe that is longitudinally cut in half. In other words, the sections 1 and 2 are of such a shape that when the forward ends thereof are connected, the shoe corresponds in shape to the present type of horseshoe. The forward ends of the sections 1 and 2 are reduced, as at 3 whereby the forward ends of said sections can overlap and these reduced ends are provided with apertures 4 and 5, the aperture 4 of the section 1 being of a greater diameter than the aperture 5 of the section 2, and the aperture 5 of said section having the walls thereof threaded to receive the outer threaded end of the shank 6 carried by a toe-calk 7, corresponding to the head of said shank. The toe calk 7 is triangular in cross section and is adapted to rest upon the sections 1 and 2, with the shank 6 serving functionally as a pivot pin for said sections. The reduced end of the section 2 is provided with a toe piece 8 projecting upwardly from said section, said toe piece having a plurality of inwardly projecting prongs 9 adapted to engage in the toe of a hoof.

The sections 1 and 2 have the rear ends or heels thereof provided with openings 10 and these openings have the walls thereof threaded to receive the threaded shanks 11 of heel calks 12, said calks having the upper edges thereof beveled, as at 13, whereby the toe calks will be somewhat pointed. The sections 1 and 2 adjacent to the heel calks have the outer edges thereof provided with upwardly projecting heel pieces 14 and each of these pieces is provided with a plurality of inwardly projecting prongs 15 adapted to engage in the sides of a hoof upon which the shoe is mounted.

The sections 1 and 2 have the bottom faces or surfaces thereof cut away to provide longitudinal recesses 16 and the remaining portions 17 of said sections are provided with inwardly projecting apertured lugs 18 contiguous to the rear ends of said recesses. In the recesses 16 are arranged the side flanges 19 of a protecting and shielding plate 20, this plate having the front and rear edges thereof bent upwardly to form flanges 21 adapted to a certain extent to protect a clamping device that will be presently described. The plate 20 is provided with rearwardly projecting heel extensions 22 and these extensions are provided with oblong slots 23 to receive the shanks 11 of the heel calks 12, whereby said calks can be used for clamping the plate 20 in position upon the bottom of the shoe.

Connecting the apertured lugs 18 of the sections 1 and 2 is a clamping device, comprising a turnbuckle 24 having the outer ends thereof bent to extend upwardly into the apertures of the lugs 18. The turnbuckle is of a conventional form and is adapted to be housed within the bottom of the hoof, while the plate 20 protects and shields the same from dirt, stones or other matter that might otherwise enter the cavity in the bottom of the hoof. This turnbuckle is employed for clamping the heel pieces 14 and the toe piece 8 to the outer sides of the hoof, whereby the shoe will be detachably held in position. By simply removing the heel calks 12, the plate 20 can be removed and the turnbuckle 24 adjusted, either to tighten the shoe upon a hoof or to release the same.

From the foregoing description it will be observed that all the elements of my invention, particularly the toe and heel calks coöperate in maintaining the shoe in proper relation to a hoof, and while in the drawings there is illustrated a preferred embodiment of the invention, it is to be understood that the structural elements thereof can be varied or changed without departing from the scope of the appended claims.

Having now described my invention what I claim as new, is:—

1. A horseshoe comprising sections having the forward ends thereof pivotally connected together, said sections having the bottom surfaces thereof recessed, hoof engaging means carried by the sections a plate adapted to fit in the recessed portions of said shoe sections, heel calks carried by the heels of said sections and adapted to retain said plate in engagement with said sections, and a clamping device connecting said sections and adapted to clamp said means in engagement with a hoof.

2. A horseshoe comprising sections, a toe calk adapted to connect the forward ends of said sections, a toe piece carried by one of said sections, heel pieces carried by both of said sections, a clamping device connecting said sections and adapted to clamp said pieces in engagement with a hoof, a plate mounted in the bottom surfaces of said sections, and heel calks adapted to retain said plate in engagement with said sections.

In testimony whereof I affix my signature in the presence of two witnesses.

STEPHEN OROSZ.

Witnesses:
W. M. SAMMERS,
G. G. MICHAEL.